United States Patent
Morgenstern et al.

(10) Patent No.: US 6,622,229 B2
(45) Date of Patent: Sep. 16, 2003

(54) VIRTUAL MEMORY STRUCTURE

(75) Inventors: Harris M. Morgenstern, Wappingers Falls, NY (US); Greg A. Dyck, Poughkeepsie, NY (US); Danny R. Sutherland, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 09/796,188

(22) Filed: Feb. 28, 2001

(65) Prior Publication Data

US 2002/0120827 A1 Aug. 29, 2002

(51) Int. Cl.[7] .............................................. G06F 12/08
(52) U.S. Cl. ....................... 711/203; 711/205; 711/206; 711/207
(58) Field of Search ................................ 711/203, 205, 711/206, 207

(56) References Cited

U.S. PATENT DOCUMENTS

| | | | |
|---|---|---|---|
| 4,356,549 A | 10/1982 | Chueh | 364/200 |
| 4,500,952 A | 2/1985 | Heller et al. | 364/200 |
| 5,155,834 A | 10/1992 | Ryan et al. | 395/425 |
| 5,479,631 A | * 12/1995 | Manners et al. | 711/138 |
| 5,628,023 A | * 5/1997 | Bryant et al. | 711/207 |
| 5,860,144 A | 1/1999 | Frank et al. | 711/206 |
| 5,893,166 A | 4/1999 | Frank et al. | 711/163 |
| 5,940,869 A | 8/1999 | Schwartz | 711/206 |
| 6,049,854 A | 4/2000 | Bedarida | 711/153 |
| 6,061,773 A | 5/2000 | Harvey et al. | 711/206 |
| 6,233,668 B1 | * 5/2001 | Harvey et al. | 711/206 |

* cited by examiner

Primary Examiner—Donald Sparks
Assistant Examiner—Kathy Takeguchi
(74) Attorney, Agent, or Firm—William A. Kinnaman; Cantor Colburn LLP

(57) ABSTRACT

An exemplary embodiment of the invention is a virtual memory structure having a first virtual memory space and a virtual page frame table space. The first virtual memory space includes at least one private area and at least one common area. The virtual page frame table space is separate from the first virtual memory space. The virtual page frame table space includes at least one page frame table entry representing a frame of real memory.

16 Claims, 5 Drawing Sheets

VIRTUAL MEMORY STRUCTURE

BACKGROUND OF THE INVENTION

The invention relates generally to memory management in computer systems and in particular to a virtual memory space that includes a separate space for a page frame table (PFT). For any computer system supporting multiple address spaces, it is necessary for the operating system to manage each allocatable unit of real storage. Such an allocatable unit of real storage may be referred to as a frame. To manage frames of real memory, some data structure is typically used to represent the status of each frame. Status information may include the process currently using the frame, the virtual address that the frame is backing (if applicable), when the frame was last referenced and whether the frame is online. Backing refers to a virtual storage concept where a frame contains the data that a virtual address refers to and the connection between the virtual address and the frame is through segment and page tables, usually referred to as dynamic address translation (DAT) structures.

For example, in the OS/390® operating system, a page frame table entry (PFTE) represents a real frame in the system. The aggregate of the PFTEs is referred to as the page frame table or PFT. FIG. 1 depicts a conventional placement of the PFT in a virtual memory space 10. As shown in FIG. 1, the PFT 12 resides within the common area 14 of every virtual address space in the system so that it is readily accessible to every process. Also included in the virtual address space 10 are private areas 16 used by specific processes in the system. A drawback to this approach is that as the size of real storage grows, the size of the PFT and the common area grows with it, effectively reducing the amount of virtual storage left for private areas in each virtual address space.

SUMMARY OF THE INVENTION

An exemplary embodiment of the invention is a virtual memory structure having a first virtual memory space and a virtual page frame table space. The first virtual memory space includes at least one private area and at least one common area. The virtual page frame table space is separate from the first virtual memory space. The virtual page frame table space includes at least one page frame table entry representing a frame of real memory.

DETAILED DESCRIPTION

Figure 1:
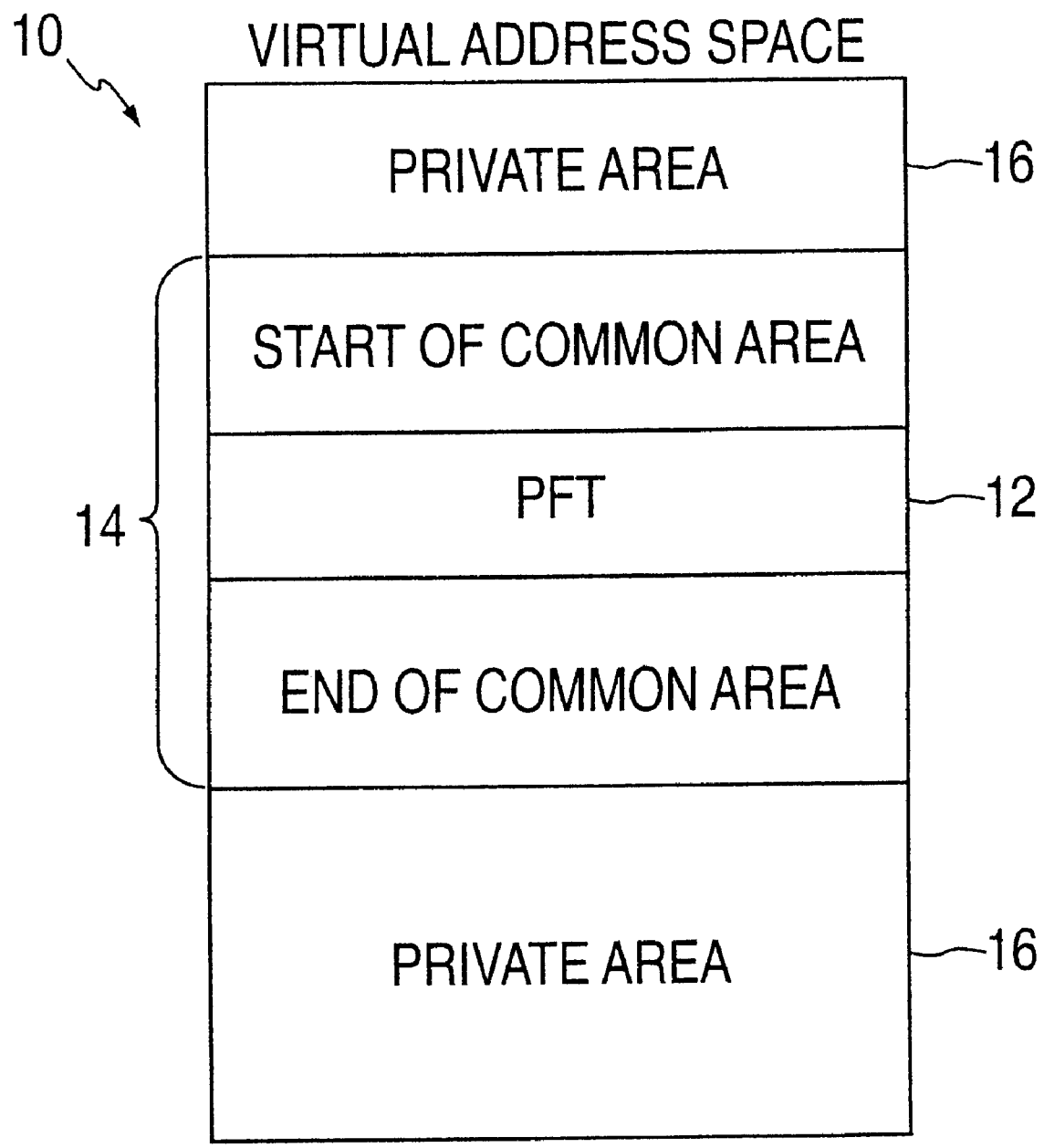
FIG. 1 depicts a conventional virtual address space.
Figure 2:
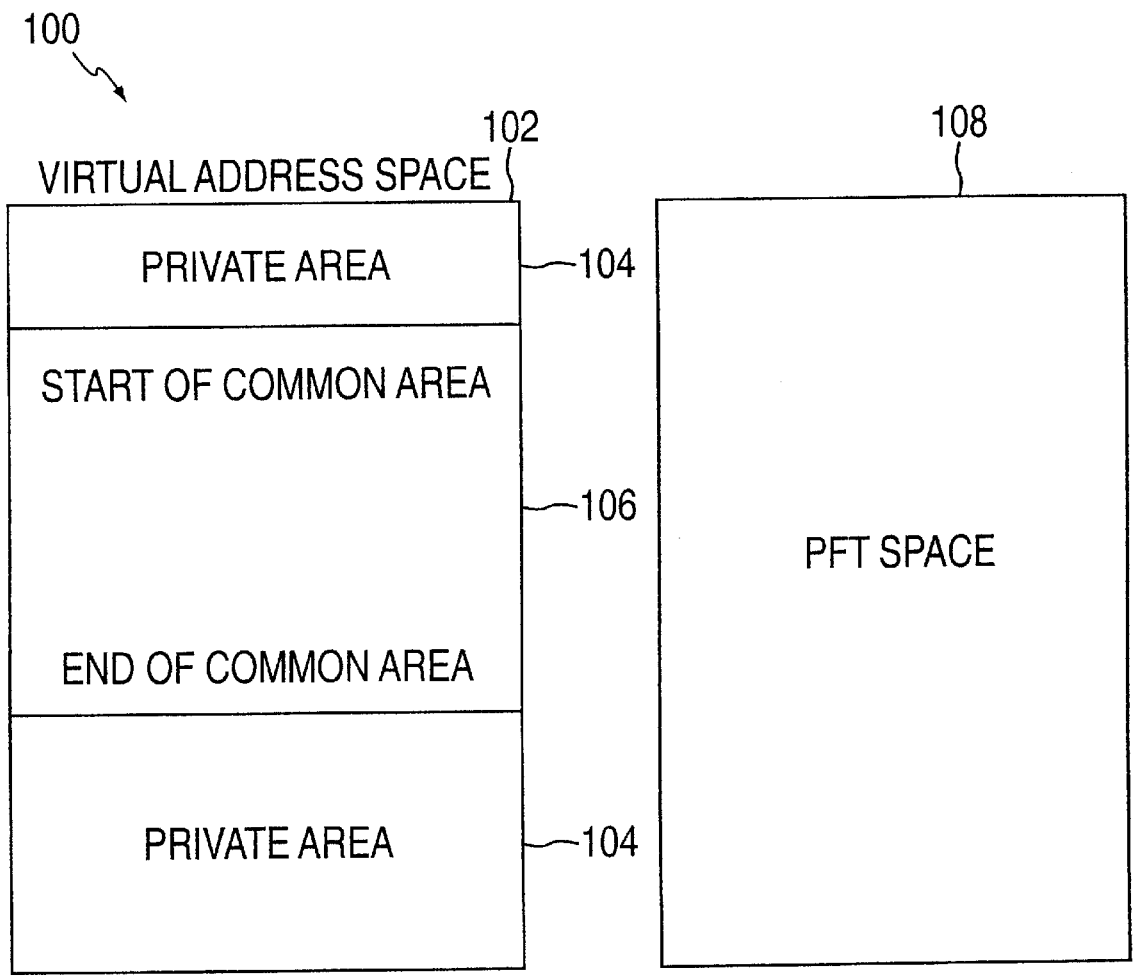
FIG. 2 depicts a virtual address structure in an embodiment of the invention.

FIG. 2 depicts virtual memory structure 100 in an embodiment of the invention. The virtual memory structure includes a first virtual address space 102 including private areas 104 and common area 106. As known in the art, private areas 104 are designated for use with specific processes whereas common area 106 may be accessed by all processes. The virtual memory structure 100 also includes a virtual PFT space 108 separate from the first virtual address space 102. As described in further detail, the virtual PFT space 108 represents real memory, containing the page frame table entries (PFTE) which correspond to real frames. Because the virtual PFT space is separate from the first virtual address space 102, increases in size of virtual PFT space 108 do not affect the private areas 104.

Figure 3:
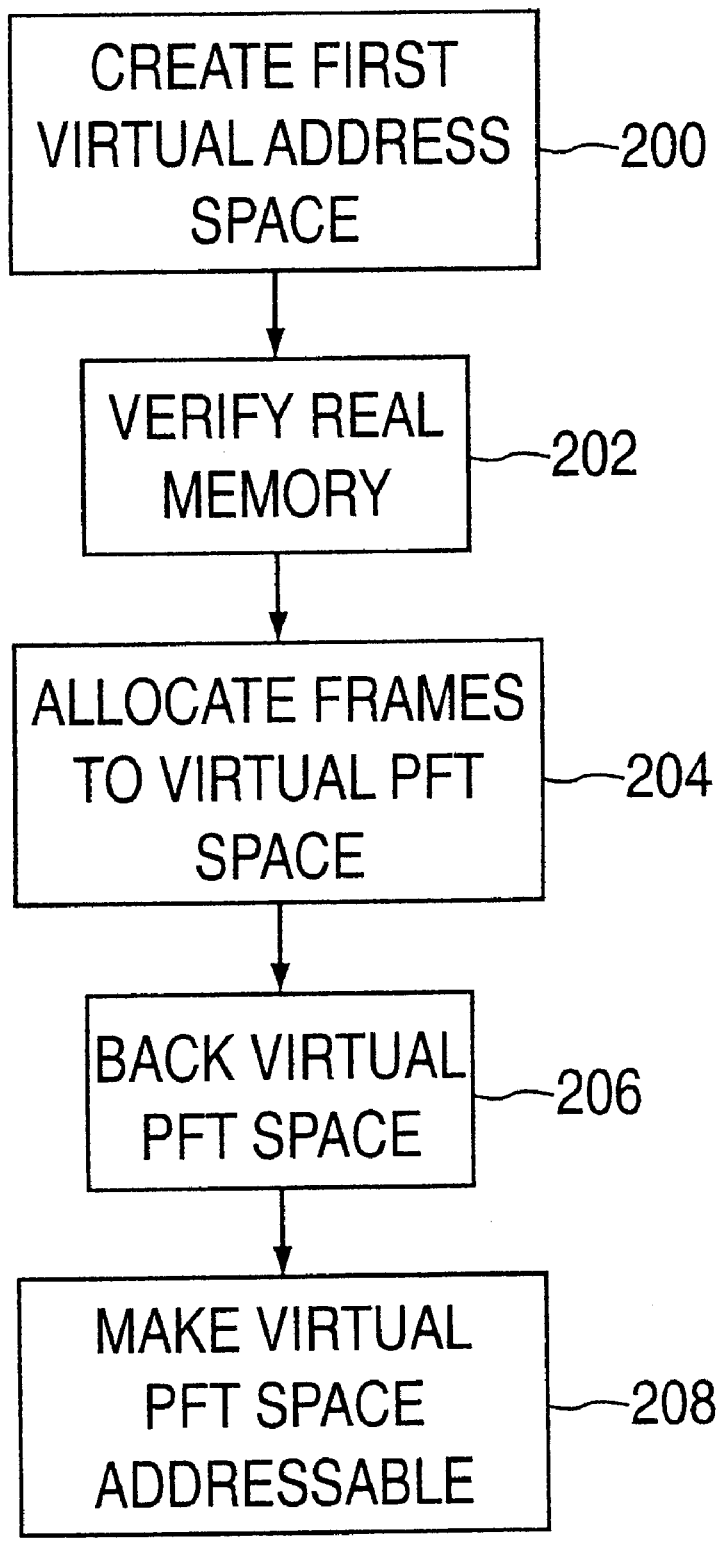
FIG. 3 is a flowchart of a process for establishing a virtual PFT space in an embodiment of the invention.
Figure 4:
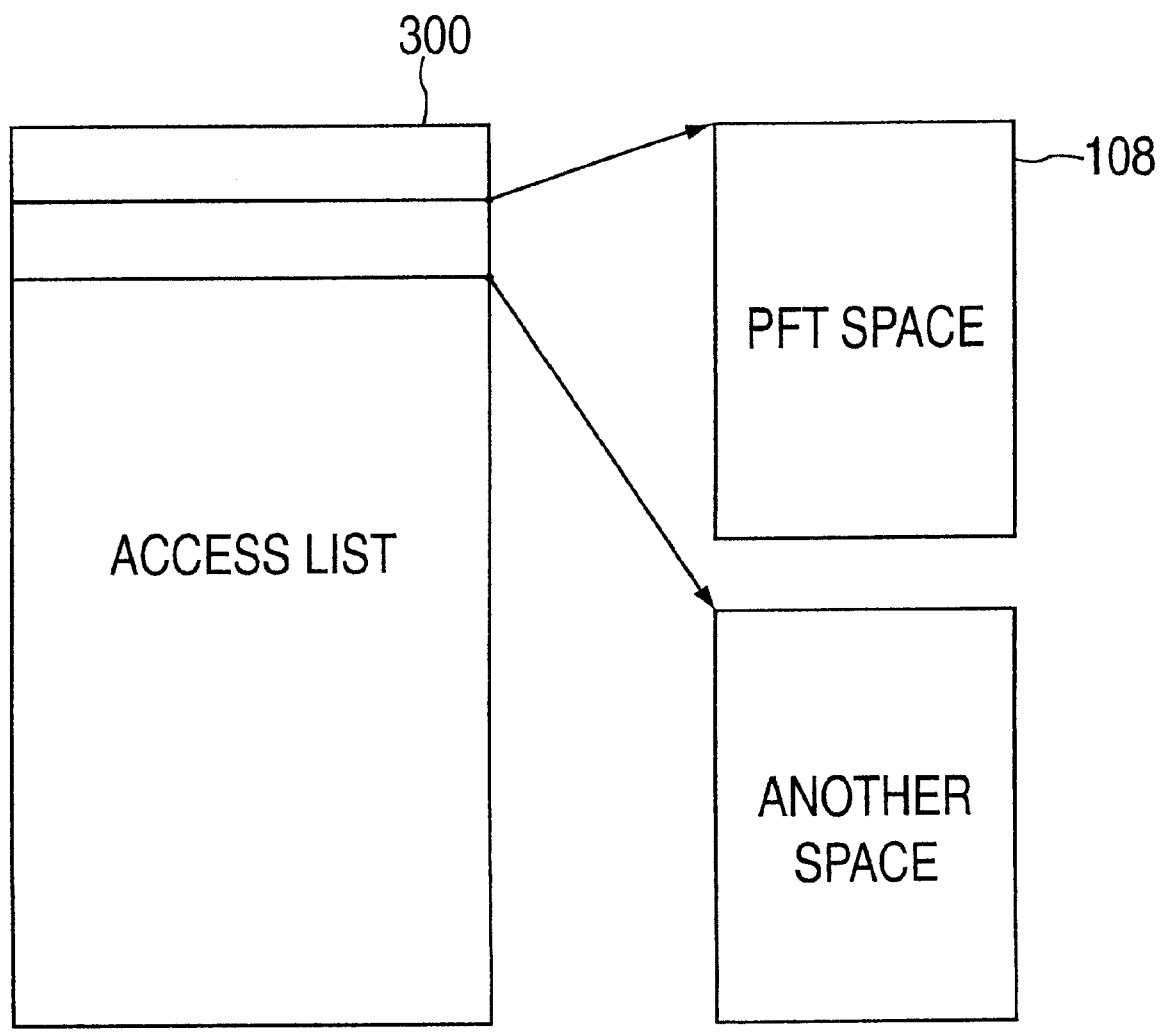
FIG. 4 depicts an exemplary common access list including a pointer to a virtual page frame table space.

FIG. 3 is a flowchart of a process for creating a virtual memory structure having first virtual address space 102 and the separate virtual PFT space 108. As shown in FIG. 3, the process begins at step 200 where the first virtual address space 102 is created using known techniques. At step 202, a subset of the real memory on the system is verified. A portion of this real memory is used for the DAT structures, segment table and page table(s), that are used to give the virtual PFT space 108 virtual addressability. At step 204, frames are also allocated to back the individual pages of the virtual PFT space. Enough frames are allocated so that a PFTE can exist for each frame in the system. At step 206 the DAT structures are assembled and the entire virtual PFT space 108 is backed with the frames obtained from step 202. Lastly, at step 208, the virtual PFT space 108 is made addressable. In an exemplary embodiment, a token which uniquely identifies the virtual PFT space 108 is added to a common access list. FIG. 4 depicts an exemplary common access list 300 having pointers to multiple address spaces including the virtual PFT space 108. This common access list 300 is used to fill the access list of all subsequently created address spaces so they have access to all of the spaces on the access list 300. Thus, all subsequently created address spaces will have access to the virtual PFT space 108.

Figure 5:
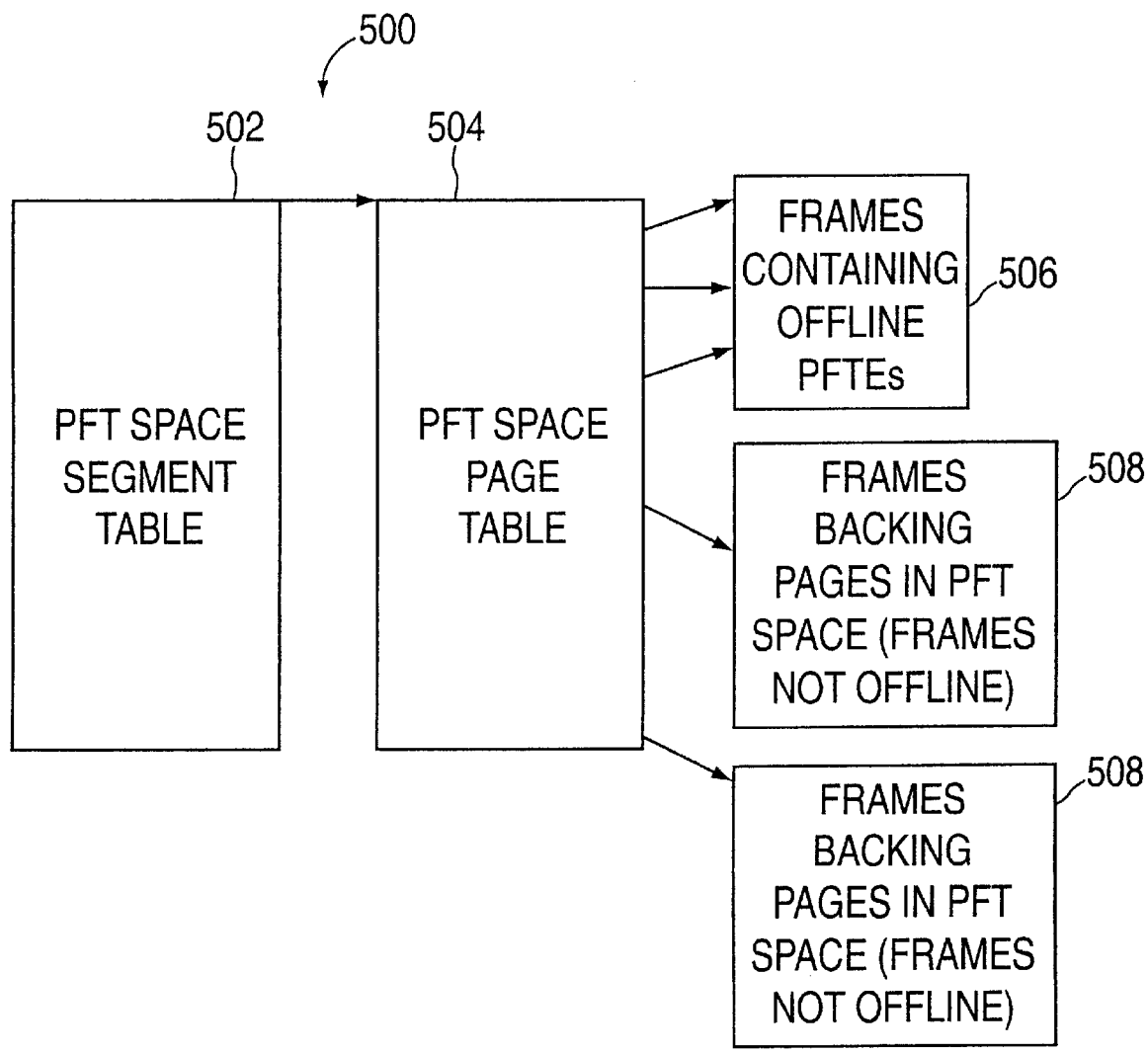
FIG. 5 depicts a virtual address structure in an embodiment of the invention.

In an alternate embodiment, the amount of real storage required to back the virtual PFT space 108 is reduced by using a single frame of real memory to represent offline storage. PFT elements (PFTEs) corresponding to offline frames of real memory all contain the same data. FIG. 5 depicts a virtual memory architecture 500 in which a PFT space segment table 502 points to a PFT space page table 504. The PFT space segment table and PFT space page table provide for virtual addressability of the virtual PFT space 108. The PFT space page table 504 points to frame 506 containing PFTEs corresponding to offline frames. The PFT space page table 504 also points to online frames 508 backing pages in the virtual PFT space. As shown in FIG. 5, a single frame 506 of real memory is used to back pages of PFTEs which represent offline storage.

Pages in the PFT space page table 504 containing PFTEs corresponding to offline real storage are backed with frame 506 at an initialization time. Operator commands which configure storage offline (e.g., the CONFIG STOR command in the OS/390® operating system) take advantage of frame 506 by returning frames that back PFTEs in the virtual PFT space that are to be marked offline to an available frame pool. These pages are subsequently backed by the frame 506 containing offline PFTEs. When the real storage is configured online, the pages in the virtual PFT space which correspond to the PFTEs which need to be marked online are backed by newly obtained real storage, replacing the frame containing offline PFTEs.

In an alternate embodiment of the invention, frame 506 containing the PFTEs of offline frames is also used to represent frames that have not been initialized. In conventional systems, initialization of real memory occurs all at once. As the size of real storage increases, more time is needed to verify the entire range of real storage. In an embodiment of the invention, the initialization time is reduced by initializing frames one at a time. Frame 506 contains the identity of frames that have not been initialized. As frames are verified during initialization, the corresponding PFTE is removed from frame 506. Once the frame is verified, it is made available for general use. This technique makes frames available for processes as the frames are verified rather than waiting for the entire range of real memory to be initialized.

The above described embodiments of the invention can be embodied in the form of computer-implemented processes and apparatuses for practicing those processes. For example, the creation of the virtual memory structure may be implemented by a processor executing a computer program such as an operating system. The invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the processor to create specific logic circuits.

While exemplary embodiments have been shown and described, various modifications and substitutions may be made thereto without departing from the spirit and scope of the invention. Accordingly, it is to be understood that the present invention has been described by way of illustration and not limitation.

What is claimed is:

1. A virtual memory structure comprising:
   a first virtual memory space, said first virtual memory space including at least one private area and at least one common area;
   a virtual page frame table space separate from said first virtual memory space, said virtual page frame table space including at least one page frame table entry representing a frame of real memory; and
   a common access list, said common access list populating an access list for subsequently generated address spaces, said common access list including a pointer to said virtual page frame table space such that subsequently generated address spaces have access to the virtual page frame table and said frame of real memory represented by said at least one page frame table entry.

2. The virtual memory structure of claim 1 wherein said virtual page frame table space includes a page frame table space segment table.

3. The virtual memory structure of claim 2 wherein said virtual page frame table space includes a page frame table space page table, said page frame table segment table including at least one pointer to said page frame table space page table.

4. The virtual memory structure of claim 3 wherein said page frame table space page table includes a pointer to a frame of real memory containing page frame table entries corresponding to offline frames.

5. The virtual memory structure of claim 3 wherein said page frame table space page table includes a pointer to a frame of real memory containing page frame table entries corresponding to frames not yet initialized.

6. The virtual memory structure of claim 4 wherein said page frame table entries have the same data.

7. The virtual memory structure of claim 3 wherein said page frame table space page table includes a pointer to a frame of real memory backing a page in the virtual page frame table space.

8. The virtual memory structure of claim 4 wherein said page frame table space page table includes a pointer to a frame of real memory backing a page in the virtual page frame table space.

9. A medium encoded with machine-readable computer program code for generating a virtual structure, the medium including instruction for causing a processor to generate a virtual memory structure, the virtual memory structure comprising:
   a first virtual memory space, said first virtual memory space including at least one private area and at least one common area;
   a virtual page frame table space separate from said first virtual memory space, said virtual page frame table space including at least one page frame table entry representing a frame of real memory; further comprises:
      a common access list, said common access list populating an access list for subsequently generated address spaces, said common access list including a pointer to said virtual page frame table space such that subsequently generated address spaces have access to the virtual page frame table and said frame of real memory represented by said at least one page frame table entry.

10. The medium of claim 9 wherein said virtual page frame table space includes a page frame table space segment table.

11. The medium of claim 10 wherein said virtual page frame table space includes a page frame table space page table, said page frame table space segment table including at least one pointer to said page frame table space page table.

12. The medium of claim 11 wherein said page frame table space page table includes a pointer to a frame of real memory containing page frame table entries corresponding to offline frames.

13. The medium of claim 11 wherein said page frame table space page table includes a pointer to a frame of real memory containing page frame table entries corresponding to frames not yet initialized.

14. The medium of claim 12 wherein said page frame table entries have the same data.

15. The medium of claim 12 wherein said page frame table space page table includes a pointer to a frame of real memory backing a page in the virtual page frame table space.

16. The medium of claim 12 wherein said page frame table space page table includes a pointer to a frame of real memory backing a page in the virtual page frame table space.

* * * * *